United States Patent
Kim et al.

(10) Patent No.: US 8,120,892 B2
(45) Date of Patent: Feb. 21, 2012

(54) ELECTRODE FOR SUPERCAPACITOR HAVING METAL OXIDE DEPOSITED ON ULTRAFINE CARBON FIBER AND THE FABRICATION METHOD THEREOF

(75) Inventors: Dong Young Kim, Seoul (KR); Seong Mu Jo, Seoul (KR); Sung-Yeon Jang, Daegu (KR); Young Rack Ahn, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 981 days.

(21) Appl. No.: 12/081,327

(22) Filed: Apr. 15, 2008

(65) Prior Publication Data
US 2008/0251971 A1    Oct. 16, 2008

(30) Foreign Application Priority Data
Apr. 16, 2007    (KR) .................... 10-2007-0037096

(51) Int. Cl.
*H01G 9/00*    (2006.01)

(52) U.S. Cl. ........ 361/502; 361/503; 361/504; 361/509; 361/512; 361/525

(58) Field of Classification Search .................. 361/502, 361/503–504, 508–509, 512, 516–519, 523–525
See application file for complete search history.

(56) References Cited

U.S. PATENT DOCUMENTS 6,038,123 A * 3/2000 Shimodaira et al. .......... 361/502
6,094,338 A * 7/2000 Hirahara et al. .............. 361/502

* cited by examiner

*Primary Examiner* — Nguyen T Ha
(74) *Attorney, Agent, or Firm* — Ladas & Parry LLP

(57) ABSTRACT

The present invention discloses an improved electrode for a supercapacitor and a method of preparation thereof. The inventive electrode comprises a collector, a carbon substrate disposed on the collector comprising ultrafine carbon fibers having a specific surface area of at least 200 m$^2$/g (BET) and a $d_{002}$ value of 0.36 nm or less, and a metal oxide thin layer formed on the carbon substrate. The electrode of the subject invention retains a high specific capacitance during high-speed charging and discharging cycles.

6 Claims, 6 Drawing Sheets

ELECTRODE FOR SUPERCAPACITOR HAVING METAL OXIDE DEPOSITED ON ULTRAFINE CARBON FIBER AND THE FABRICATION METHOD THEREOF

FIELD OF THE INVENTION

The present invention provides an electrode for a supercapacitor comprising an electrochemically deposited metal oxide thin layer on ultrafine carbon fibers having a high specific surface area and a high electric conductivity, and the fabrication method thereof.

BACKGROUND OF THE INVENTION

A supercapacitor can be broadly classified as an electric double layer capacitor (EDLC) which employs carbon particles or fibers having a high specific surface area as an electrode material or as a pseudocapacitor comprising a metal oxide or a conductive polymer.

An EDLC exhibits a long lifetime but due to the accumulation of charges only on the surface of the electric double layer, the capacitance thereof is lower than that of a metal oxide-based or an electric conductive polymer-based supercapacitor.

The metal of a metal oxide-based supercapacitor is capable of undergoing a change in its multiple valence states, which allows oxidation and reduction reactions to take place. Such oxidation and reduction reactions corresponding to charging and discharging processes require the ion and electron to move rapidly between the electrolyte and the electrode, and accordingly, the electrode is preferred to have a high specific surface area, and the electrode active material, a high electric conductivity.

Since ruthenium oxide heat-treated at a low temperature exhibits a very high specific capacitance as well as a high electric conductivity similar to that of a metal (J. Electrochem. Soc. 142, 2699 (1995)), a number of studies have been conducted to use ruthenium oxide as an electrode material for a supercapacitor. However, ruthenium is expensive and only the ruthenium oxide exposed on the surface of the ruthenium oxide particles participates in the oxidation-reduction reaction. Therefore, a variety of methods such as forming a complex of ruthenium oxide with an inexpensive metal oxide or a carbon material, or depositing ruthenium oxide on a support having a large specific surface area have been attempted.

Various carbon materials have been considered for use as a support. Active carbon has a high specific surface area of 1,000 $m^2$/g or more, but has a low electric conductivity; while carbon black has an excellent electric conductivity, but the specific surface area thereof is very low, about 10 $m^2$/g or less. Therefore, an electrode for a supercapacitor prepared by depositing a metal oxide thin layer on such carbon materials has a tendency to exhibit a high specific capacitance at low-speed charging and discharging cycles, but a low specific capacitance at a high-speed charging and discharging. A supercapacitor employed in fuel cell-driven or hybrid automobiles is required to have good high-speed charging and discharging capabilities.

Accordingly, there has been a need to develop an electrode for a supercapacitor having a high specific surface area and a good electric conductivity which is capable of maintaining a high specific capacitance during high-speed charging and discharging cycles.

SUMMARY OF THE INVENTION

The present invention provides an electrode for a supercapacitor which can maintain a high specific capacitance during high-speed charging and discharging cycles, which comprises an ultrafine carbon fiber substrate having a good electric conductivity as well as a high specific surface area having a metal oxide thin layer electrochemically deposited thereon.

DETAILED DESCRIPTION OF THE INVENTION

A preferred embodiment of the present invention is an electrode for a supercapacitor comprising a collector, a carbon substrate comprising an ultrafine carbon fiber whose specific surface area is at least 200 $m^2$/g (BET) and $d_{002}$ is 0.36 nm or less, and a metal oxide thin layer formed on the carbon substrate.

Another preferred embodiment of the present invention is a method for preparing the electrode for a supercapacitor comprising the steps of forming ultrafine carbon fibers by electrospinning a melt or a solution of a carbon fiber-precursor polymer followed by carbonizing, attaching a mat-type carbon substrate comprising the ultrafine carbon fibers on the collector using a binder, and forming a metal oxide thin layer on the carbon substrate.

Still another preferred embodiment of the present invention is a method for preparing the electrode for a supercapacitor comprising the steps of forming ultrafine carbon fibers by electrospinning a melt or a solution of a carbon fiber-precursor polymer to obtain spun fibers and carbonizing the spun fibers, forming a carbon substrate by coating a mixture prepared by grinding the ultrafine carbon fibers followed by mixing with a binder on a collector, and forming a metal oxide thin layer on the carbon substrate.

Figure 1:
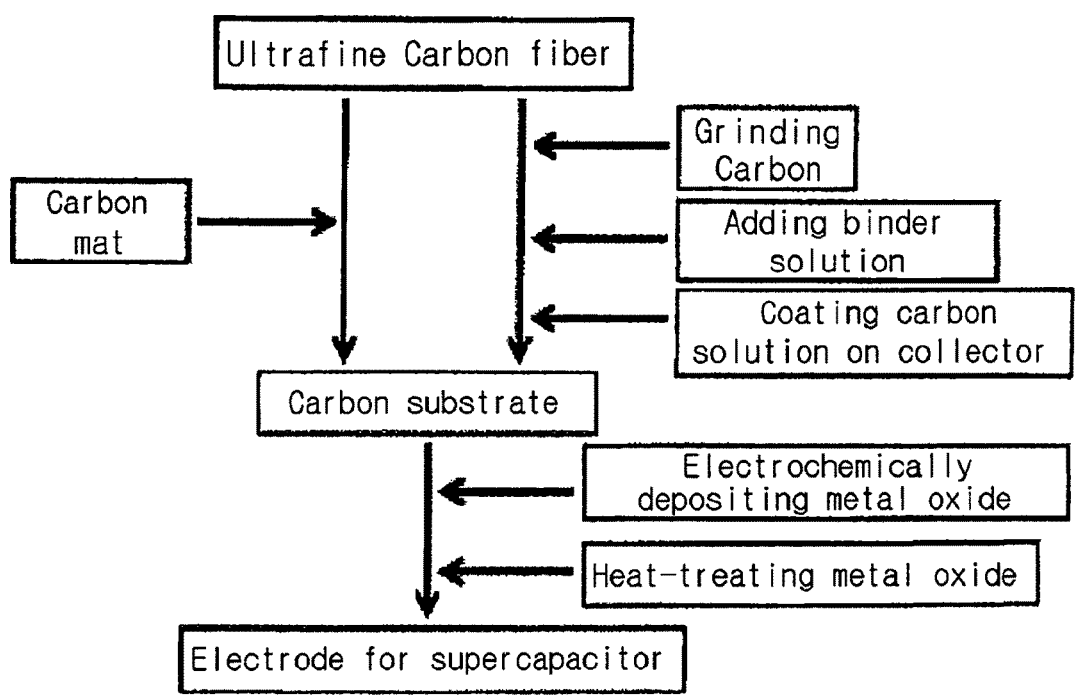
FIG. 1: A schematic diagram for the preparation of the electrode for a supercapacitor in accordance with one embodiment of the subject invention.

As shown in FIG. 1, the electrode of the present invention may be prepared as follows.

First, ultrafine carbon fibers are prepared. Then, a carbon substrate is formed on a collector by one of the following two methods. One method is to attach a mat-type ultrafine carbon fiber obtained above on a collector using a binder. The other method is to obtain a carbon substrate by grinding the ultrafine carbon fiber obtained above, adding the ground carbon fiber to a binder solution, coating the carbon solution on the collector and drying it to remove a solvent.

Subsequently, the carbon substrate is dipped in a metal oxide precursor solution and a metal oxide layer is deposited thereon when the solution is treated by constant current or cyclic voltammetry method. The electrode thus prepared is washed and heat-treated.

Hereinafter, a method for preparing for supercapacitor according to the present invention will be described specifically in stages.

Preparation of Ultrafine Carbon Fiber

First, an ultrafine carbon fiber is prepared by electrospinning a melt or a solution of a carbon fiber-precursor polymer, followed by carbonizing. The ultrafine carbon fiber may be a graphitical carbon fiber, a graphitical carbon or a carbon nanotube having a high electric conductivity.

Examples of the precursor polymer of the carbon fiber are 1) petroleum pitch or coal pitch, 2) polyacrylonitrile or polyacrylonitrile copolymers, 3) cellulose or cellulose derivatives, and 4) halogenated polymers. The halogenated polymers include, for instance, i) homopolymers and copolymers of fluoropolymers comprising poly(vinylidene fluoride), poly(vinylidenefluoride-co-hexafluoropropylene), poly(vinylidenefluoride-co-tetrafluoroethylene), poly(vinylidenefluoride-co-trifluoroethylene) and perfluoropolymer; ii) homopolymers and copolymers of halogenated monomers comprising poly(vinyl chloride), poly(vinylidene chloride), poly(vinylidenechloride-co-vinylchloride) and saran polymer; and iii) a mixture thereof.

In addition, the present invention provides a method for preparing an ultrafine polymer fiber having a high specific surface area and a good electric conductivity by electrospinning. When a low-viscosity liquid is sprayed under a high critical voltage electric field, an aerosol consisting of submicron droplets having a narrow size distribution may be obtained. This phenomenon is called electrostatic spray or electrospray, which has been the subject of intense interests in the academic and industrial sectors. In contrast to the behavior of a low viscosity liquid during electrospraying, a viscous polymer solution or a polymer melt forms fibers when subjected electrospray under a high voltage electrostatic force. Thus, in order to distinguish from the electrospraying of a low viscosity liquid which leads to the formation of ultrafine liquid droplets, the electrostatic spraying of a high viscosity liquid such as a polymer melt to form fibers is called electrostatic spinning or electrospinning.

The electrospinning employed in the present invention may be designed such that an inert gas or air can be injected together with the liquid through an electrospinning nozzle in a manner similar to a melt-blown method in order to increase the productivity.

Although an ungraphitized carbon is employed as a conventional electrode material for a supercapacitor (Applied Physics Letters 83(6), 1216 (2003)), it has the problem that its specific capacitance becomes drastically lower when used in high-speed charging and discharging processes. Accordingly, the present invention employs graphitized superfine carbon fibers. That is, the present invention employs graphitical ultrafine carbon fibers having a graphitization degree corresponding to $d_{002}$ of 0.36 nm or less and a good electric conductivity by electrospinning a carbon fiber-precursor polymer. Specifically, such ultrafine carbon fibers having both a good electric conductivity and a high specific surface area may be prepared by one of the following two methods.

First, a melt or a solution of the precursor polymer containing a graphitization catalyst is electrospun to produce ultrafine polymer fibers, which are carbonized, followed by graphitizing under a vacuum or an inert gas environment to produce porous graphitical ultrafine carbon fibers.

Graphitical carbon fibers obtained by graphitizing at a high temperature of 2,000 to 3,000° C. in a conventional method generally have a low specific surface area of less than several tens of $m^2/g$. However, the ultrafine polymer fibers obtained by electrospinning a melt or a solution of a polymer containing a graphitization catalyst can undergo graphitization at a low temperature of 500 to 2,000° C. The graphitical carbon fibers thus prepared have a $d_{002}$ value of 0.36 nm or less and a specific surface area of 200 $m^2/g$ (BET) or higher. Such graphitic carbon fibers have a plurality of micropores and mesopores.

The graphitization catalyst which may be used in the present invention is a particular form of a metal selected from the group consisting of: 1) a transition metal such as Pt, Ru, Cu, Fe, Ni, Co, Pd, W, Ir, Rh, Sr, Ce, Pr, Nd, Sm, Re and a mixture thereof, 2) a non-transition metal such as Mg, B, Al and a mixture thereof; 3) a mixture of Mg and said transition metal. Alternatively, the catalyst may be one of the compounds of the above transition metals such as: 1) a metal chloride, e.g., $CuCl_2$, $CoCl_2$, $OsCl_3$, $CrCl_2$, $VCl_3$, $TaCl_2$, $TiCl_4$, $(NH_3)_6RuCl_3$, $ZrCl_4$, $HfCl_4$, $MnCl_2$, $ZnCl_2$, $FeCl_3$, $NiCl_2$, $PdCl_2$ and $MgCl_2$; 2) a metal nitrate, e.g., $Pd(NO_3)_2$, $(NH_3)_4Pt(NO_3)_2$, $Fe(NO_3)_3$, $Ni(NO_3)_2$ and $Mg(NO_3)_2$; and 3) an organometallic compound such as iron acetylacetonate, ferrocene, Pd-trioctylphosphine and $Ni(cyclooctadiene)_2$, said metal compounds being capable of forming corresponding metal particles during the carbonization step.

As stated above, the graphitical ultrafine carbon fibers having a high specific surface area and a good electric conductivity may be prepared by carbonization, followed by graphitization in a vacuum or an inert gas environment, but such procedure may also be conducted in the presence of a $C_1$-$C_{10}$ hydrocarbon gas, wherein the graphitization catalyst also catalyzes the growth of carbon nanotubes (CNTs) or carbon nanofibers (CNFs) when the hydrocarbon gas is present. Therefore, the present invention also provides a carbon material which has a fluffy form of CNTs or CNFs grown on the surface of the graphitical ultrafine carbon fibers having a high specific surface area and a good electric conductivity.

Alternatively, the ultrafine carbon fibers having a high specific surface area and a good electric conductivity may be prepared according to a second method which comprises graphitizing the ultrafine polymer fibers obtained by electrospinning a carbon fiber-precursor polymer solution containing a carbon black or carbon nanotubes having a high conductivity uniformly dispersed therein, in the absence of a graphitization catalyst.

The ultrafine polymer fibers prepared by one of the two methods described above may melt and fuse together when exposed to the carbonization condition. To prevent this problem, a specific pretreatment step may be conducted prior to the carbonization. That is, the fibers may be rendered unfusable through exposing to a dehalogenation step involving a heat treating at a temperature of 300° C. or less, or subjected to chemical treatment with a strong base.

Further, the ultrafine carbon fibers prepared by the above methods may be preferably subjected to an activation process under an oxidative environment in order to endow more pores thereon, which is desirable in terms of increasing the specific surface area and facilitating the process of depositing thereon a metal oxide thin layer electrochemically. When the carbon fiber-precursor polymer is a halogenated polymer, a high specific surface area of hundreds of $m^2/g$ or higher may be achieved without conducting said activation process, but it is nevertheless preferred to perform said activation process in the last step of carbonization. The activation process is preferably conducted at a temperature of 700 to 1,000° C. in an oxidative environment containing carbon dioxide or steam.

The ultrafine carbon fiber prepared by the method described above has a diameter ranging from 1 to 3,000 nm, preferably from 1 to 1,000 nm. Further, the ultrafine carbon fibers preferably have a high specific surface area of 200 $m^2/g$ (BET) or more and a $d_{002}$ value of 0.36 nm or less, and thus, the inventive fibers have both a high specific surface area and a good electric conductivity.

Preparation of Carbon Substrate

Subsequently, a carbon substrate is formed on a collector using the ultrafine carbon fibers obtained above.

The collector may be composed of a metal selected from the group consisting of titanium, palladium, platinum, stainless steel, tantalum, and an alloy thereof.

The subject invention provides the following two alternative methods for forming a carbon substrate on a collector, which does not limit the scope of the invention.

The first method is to employ a mat of the ultrafine carbon fibers obtained above as a carbon substrate. In this case, the ultrafine carbon fiber mat is attached on the collector using a binder.

The second method involves grinding the ultrafine carbon fibers to obtain a desired powder form thereof, and mixing the ground carbon fiber powder with a binder solution to form a mixture which is coated onto the collector. In this case, a conducting material may be further added to said mixture.

The coating may be conducted by a doctor-blade method or an electrospray method. For example, in case of employing the electrospray method, the mixture containing the ground ultrafine carbon fibers and the optional conducting material dispersed uniformly in the binder solution is discharged at a rate of 5 to 150 µl/min through the spray tip on the collector under an applied voltage of 5 to 20 kV to form a carbon substrate having a thickness of 1 to 30 µm on the collector.

Examples of applicable binders are polyurethane and polyurethane copolymers comprising polyetherurethane; cellulose derivatives such as cellulose acetate, cellulose acetate butylate and cellulose acetate propionate; polymethylmethacrylate (PMMA); polymethylacrylate (PMA); polyacryl copolymers; polyvinylacetate and polyvinylacetate copolymers; polyvinylalcohol (PVA); polyperfurylalcohol (PPFA); polystyrene and polystyrene copolymers; polyethyleneoxide (PEO); polypropyleneoxide (PPO) and polyethyleneoxide copolymers; polypropyleneoxide copolymers; polycarbonate (PC), polyvinylchloride (PVC), polycaprolactone, polyvinylpyrrolidone (PVP), polyvinylfluoride, polyvinylidenefluoride and the copolymers thereof; polyamide; and the like, but are not intended to limit the scope of the invention.

Further, examples of the conducting material that can be used in the above procedure are Super-P, Ketjen black, acetylene black and vapor grown carbon fibers.

Further, examples of the solvent usable for preparing the binder solution are N-methyl-2-pyrrolydone, dimethylacetamide, dimethylformamide, acetone and ethanol, which does not limit the scope of the invention.

Formation of Metal Oxide Thin Layer

In the final step, a metal oxide thin layer is deposited on the carbon substrate formed on the collector.

Examples of the metal oxide include ruthenium oxide, manganese oxide, nickel oxide, vanadium oxide, cobalt oxide, tungsten oxide, iridium oxide, rubidium oxide, and a mixture thereof.

The formation of the metal oxide thin layer for a high-capacitance capacitor on the carbon substrate may be conducted by electrochemical deposition employing a solution of a metal oxide precursor. Specifically, the carbon substrate is dipped in a solution of a metal oxide precursor, which is deposited on the carbon substrate by a constant current or cyclic voltammetry method.

For instance, the formation of a ruthenium oxide thin layer is conducted by dipping the carbon substrate in a solution prepared by dissolving trichlororuthenium hydrate, a ruthenium oxide precursor, in deionized water to a concentration between 0.005 to 0.1 moles, followed by allowing the precursor to deposit on the carbon substrate at 30 to 70° C. If necessary, an electrolyte such as sodium chloride or hydrogen chloride may be added to said precursor solution. The deposited precursor layer is preferably heat-treated at a temperature of 150 to 250° C. for 0.5 to 2 hours to form a ruthenium oxide electrode layer.

When the metal oxide thin layer is deposited on the carbon substrate by a constant current method, it is preferred that the deposition is carried out using a constant applied current density of 0.5 mA/cm$^2$ to 10 mA/cm$^2$ so that the metal oxide is deposited as a cathode while an electrochemically stable metal such as platinum or titanium is formed as an anode.

When a cyclic voltammetry method is employed, a 3-electrode system is preferably used. In this case, the sweep rate is preferably adjusted to 10 to 1,000 mV per second, and the amount of the ruthenium oxide may be controlled depending on the cycle number. In case of employing this deposition method, the capacitance thereof changes with the electric potential applied during the deposition, and the deposition is preferably conducted at an applied potential of 0.2 to 1.4V relative to the Ag/AgCl electrode.

Hereinafter, the present invention will be described more specifically based on Examples. However, the present invention is not intended to be limited to the following Comparative Examples and Examples, and many variations of the subject invention according to the interpretation of the claims are possible.

Comparative Example 1

A Comparative Electrode Obtained Employing a Superactive Carbon Having a Specific Surface Area of 3,200 m$^2$/g 0.85 g of a superactive carbon having a specific surface area of 3,200 m$^2$/g was mixed with 0.05 g of Super-P. Added to the resulting mixture were 0.1 g of polyvinylidenefluoride-hexafluoropropylene (PVdF-HFP) and 5 ml of N-methyl-2-pyrrolidone (NMP) to form a slurry. The slurry was coated on a collector using the doctor-blade method, and dried to obtain a superactive carbon substrate.

The deposition of a ruthenium oxide thin layer on the superactive carbon substrate was carried out by cyclic voltammetry method using an aqueous solution of ruthenium chloride. The superactive carbon substrate was soaked in 0.05M ruthenium chloride, and the deposition was carried out by sweeping 10 times at a voltage of 0.2 to 1.4V relative to an Ag/AgCl electrode at a sweep rate of 300 mV/sec. The deposited electrode was heat-treated at 175° C. for 30 minutes.

Figure 3A:
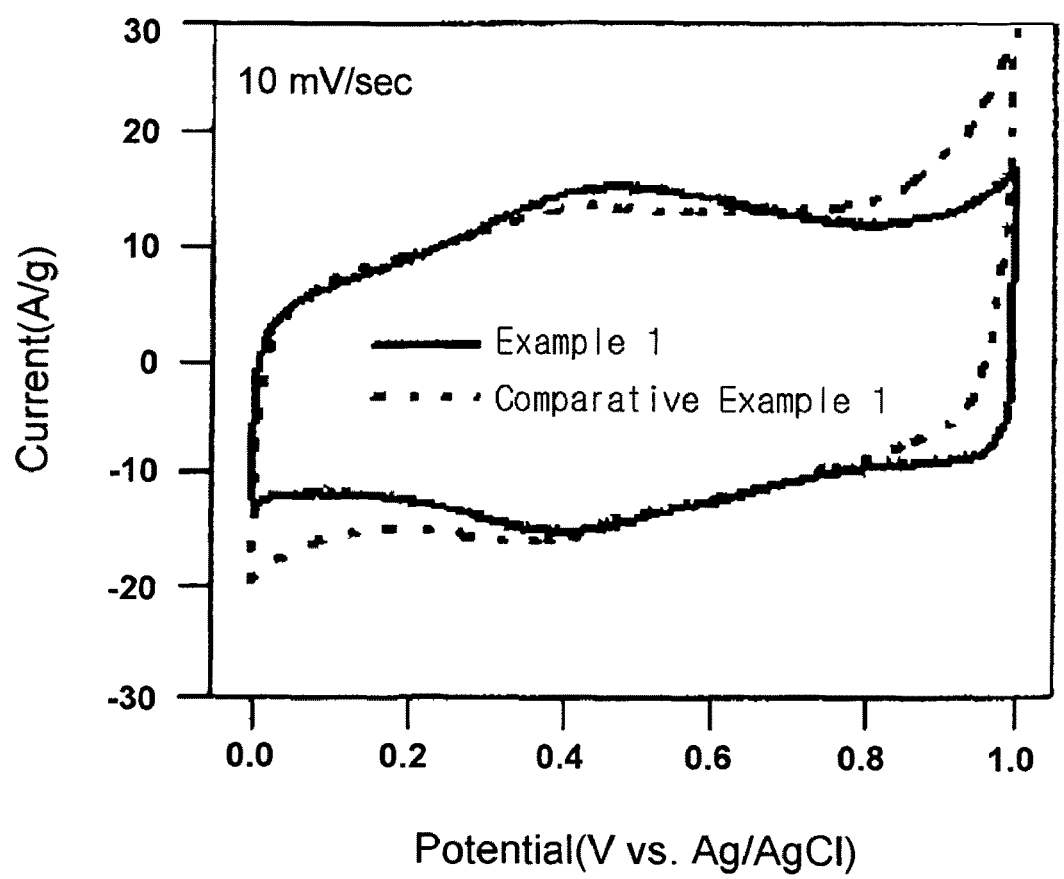
FIGS. 3a and 3b: Cyclic voltammetry curves of the electrode at two different charge-discharge rates in accordance with Example 1 and a Comparative Example 1, respectively.
Figure 3B:
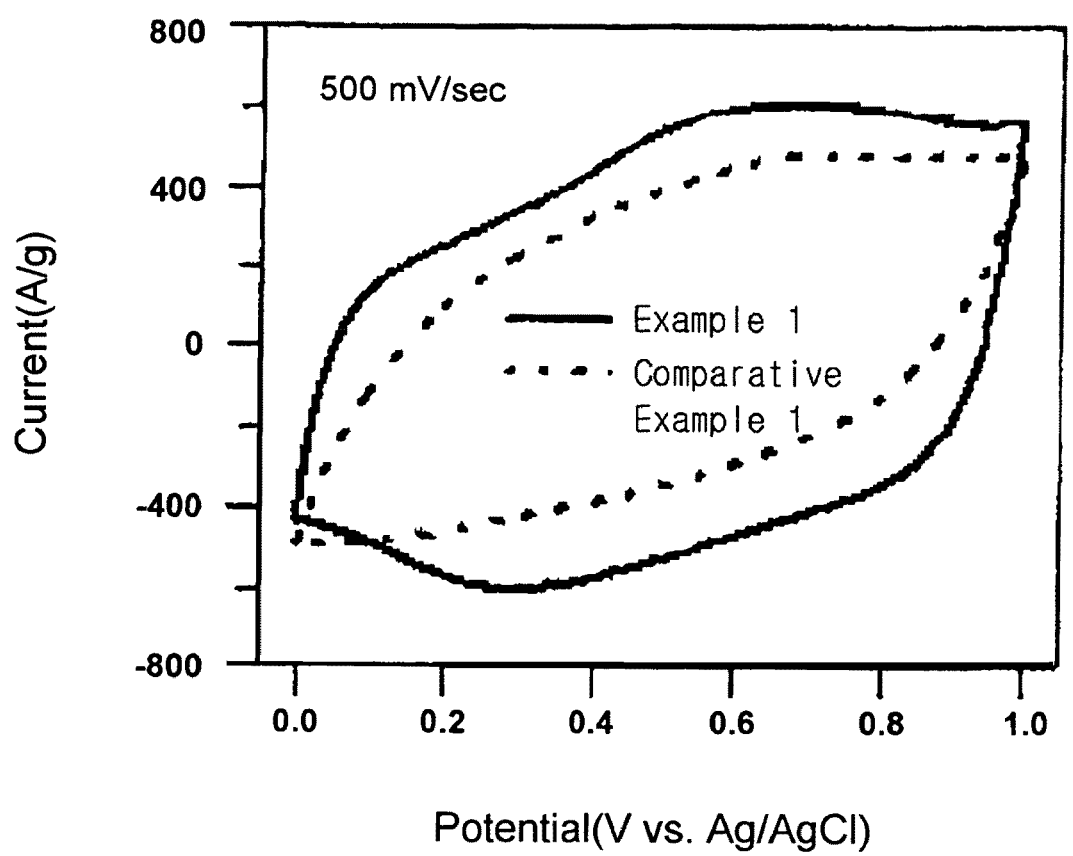

FIG. 3a shows the result obtained at a sweep rate of 10 mV/sec, wherein when the sweep direction of an electric potential was changed, the response current changed rapidly, but, as shown in FIG. 3b, when the sweep rate was elevated to 500 mV/sec, the change in the response current became slow. Further, the response current generally increased with the sweep rate, the incremental increase in the response current failed to respond to the increasing sweep rate. Accordingly, the specific capacitance of the electrode of comparative example 1 decreases disproportionally as the sweep rate increased.

Comparative Example 2

Electrode Comprising Ruthenium Oxide Deposited on a Carbon Black Substrate 0.9 g of Super-P was ground and added to a polymer solution containing 0.1 g of PVdF-HFP dissolved in 5 ml of NMP. The resulting mixture was coated on a titanium collector using the doctor-blade method to obtain a carbon substrate.

Ruthenium oxide was deposited on the carbon substrate in the same way as described in Comparative Example 1.

The electrode showed a specific capacitance of 410 F/g at a sweep rate of 10 mV, which is about 50% or less compared to that of the graphitical ultrafine carbon fiber electrode, and the specific capacitance of 380 F/g at a sweep rate of 500 mV/sec or more, which is about 80% or more compared to that of 10 mV/sec.

Example 1

Figure 2A:
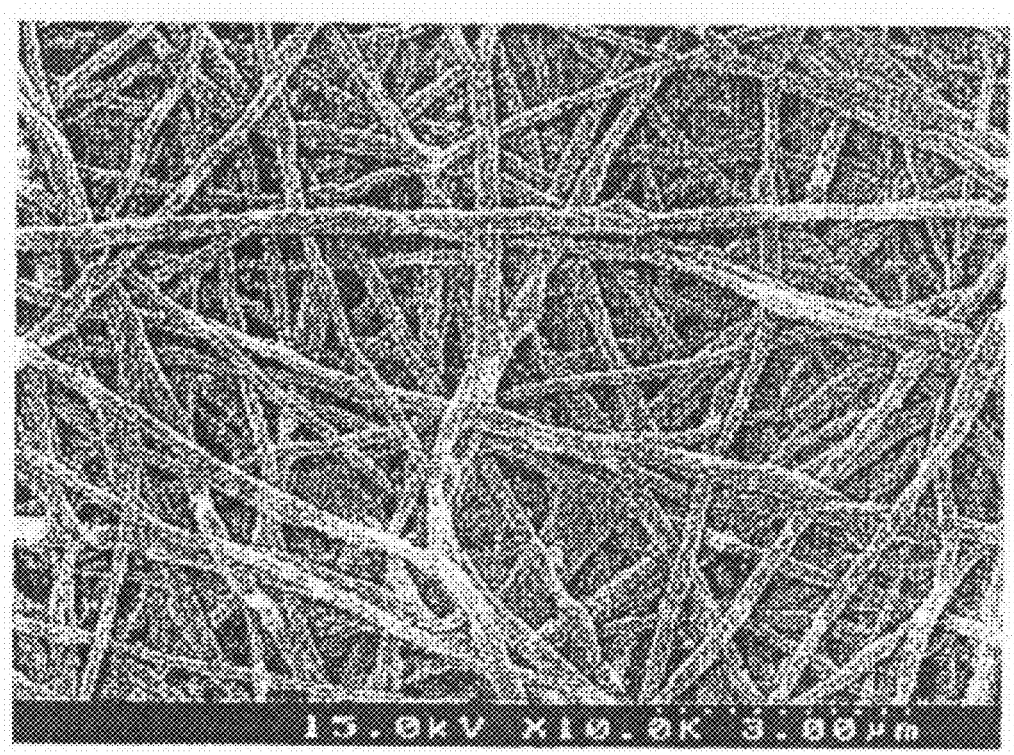
FIG. 2a: A scanning electron microscope (SEM) photograph of a graphitical ultrafine carbon fiber mat.
Figure 2B:
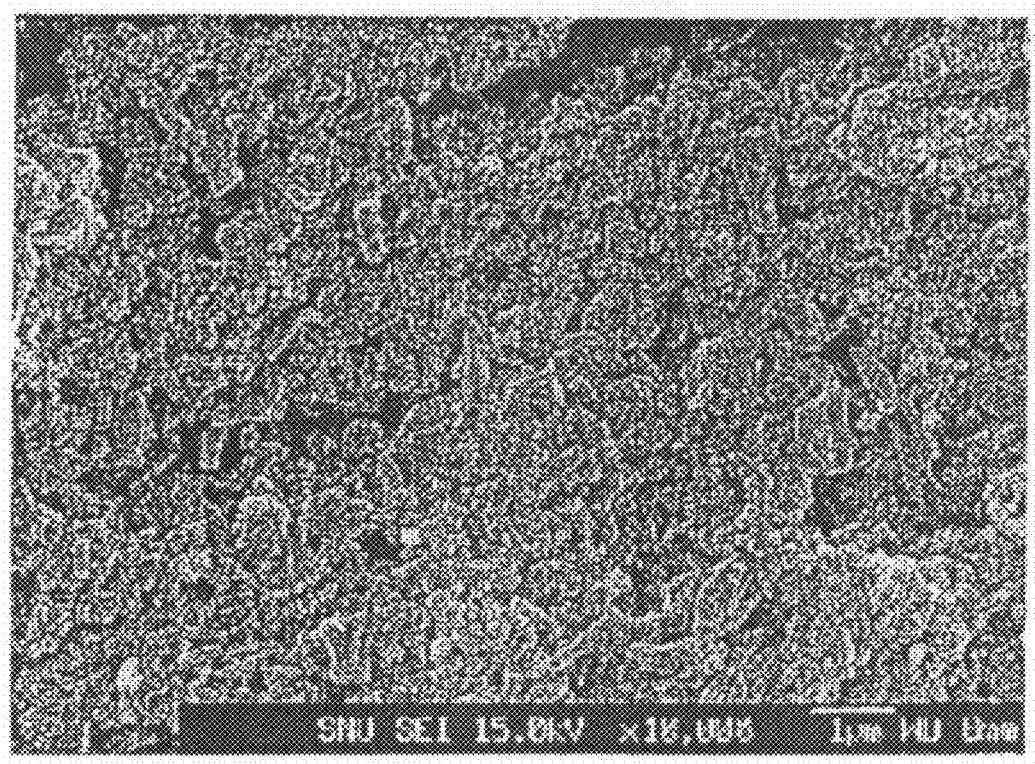
FIG. 2b: A scanning electron microscope (SEM) photograph of a carbon substrate prepared by a mixture of a ground graphitical ultrafine carbon fiber and a polymer binder.

Electrode Comprising Ruthenium Oxide Deposited on a Carbon Substrate Containing Ground Graphitical Ultrafine Carbon Fibers 1. Preparation of a Carbon Substrate 0.85 g of a graphitical ultrafine carbon fiber having a specific surface area of 430 m$^2$/g was mixed with 0.05 g of Super-P. Added to the resulting mixture was the polymer solution containing 0.1 g of PVdF-HFP dissolved in 5 ml of NMP. The resulting mixture was coated on a titanium collector using the doctor-blade method to obtain a carbon substrate. As shown in FIG. 2b, the graphitical carbon fibers having an average diameter of 100 to 200 nm were well mixed with Super-P and PVdF-HFP.

2. Deposition of RuO$_2$

The deposition of a ruthenium oxide thin layer on the carbon substrate was carried out by cyclic voltammetry method using an aqueous solution of ruthenium chloride. The graphitical carbon fiber substrate was soaked in 0.05M ruthenium chloride, and the deposition was carried out by sweeping 10 times at a voltage of 0.2 to 1.4V relative to an Ag/AgCl electrode at a sweep rate of 300 mV/sec. The deposited electrode was heat-treated at 175° C. for 30 minutes.

FIGS. 3a and 3b respectively show the results obtained at a sweep rate of 10 mV/sec and 500 mV/sec, wherein an electrolyte was 1M of an aqueous solution of sulfuric acid and swept in a range of 0 to 1V relative to an Ag/AgCl electrode. Furthermore, as shown in FIGS. 3a and 3b, the cyclic voltammetry curves of the inventive electrode had not been changed much, which indicates that the inventive electrode maintains high specific capacitance at a high-speed charging and discharging cycle.

Figure 4:
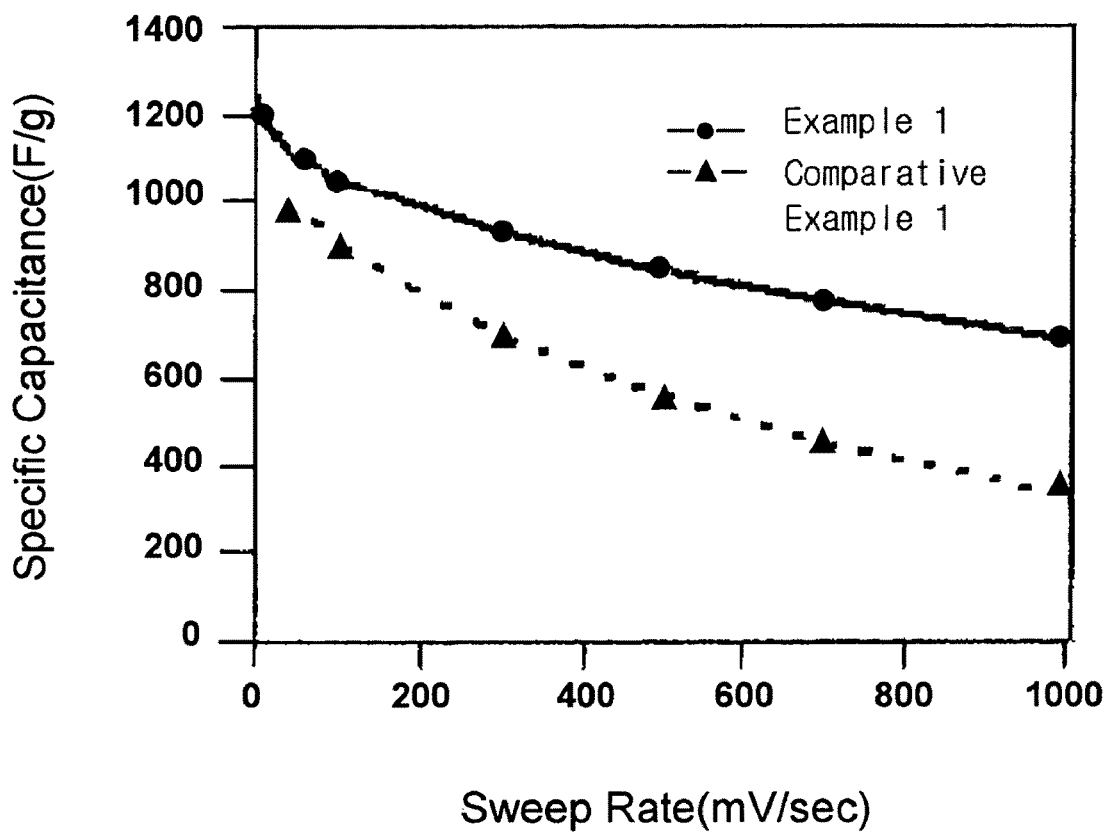
FIG. 4: Changes in the specific capacitance with the sweep rate observed for the electrode for a supercapacitor in accordance with one embodiment of the subject invention and a comparative electrode.

Further, FIG. 4 shows the specific capacitance of the electrode depending on the rate, as shown in FIG. 4, the specific capacitance of the inventive electrode was maintained about 77% in spite of the change of the sweep rate from 10 mV/sec to 500 mV/sec.

Example 2

Electrode Comprising Ruthenium Oxide Deposited on Graphitical Ultrafine Carbon Fibers Having Carbon Nanofibers Grown Thereon An electrode was prepared in the same way as described in Example 1 by employing ultrafine carbon fibers which have carbon nanofibers or carbon nanotubes grown on the surface of the graphitical ultrafine carbon fibers. Added to a polymer solution containing 0.1 g of PVdF-HFP dissolved in 5 ml of NMP were 0.85 g of the ultrafine carbon fibers which have carbon nanofibers grown on the surface and 0.05 g of Super-P. The resulting mixture was coated on a titanium collector using the doctor-blade method to obtain a carbon substrate.

To the resulting carbon substrate, a ruthenium oxide was deposited in the same way as described in Example 1.

The electrode was tested as an electrode for a supercapacitor, and the results were similar to that of Example 1.

Example 3

Electrode Comprising Ruthenium Oxide Deposited on a Carbon Mat Substrate Made of Graphitical Ultrafine Carbon Fibers A carbon substrate was prepared in the same way as described in Example 1, except that a carbon mat was attached to a collector without grinding.

A carbon substrate was prepared by dipping a carbon mat in a polymer solution containing 0.5 g of PVdF-HFP dissolved in 10 ml of NMP, and the resulting carbon mat was attached to the surface of a collector to obtain an electrode.

The test results were similar to those of Example 1, except that the specific capacitance of the electrode slightly decreased due to the increase of resistance caused by a binder.

While the invention has been described with respect to the above specific embodiments, it should be recognized that various modifications and changes may be made to the invention by those skilled in the art which also fall within the scope of the invention as defined by the appended claims.

What is claimed is:

1. An electrode for a supercapacitor comprising:
a collector;
a carbon substrate disposed on the collector comprising ultrafine carbon fibers having a specific surface area of at least 200 m$^2$/g (BET) and a d$_{002}$ value of 0.36 nm or less; and
a metal oxide thin layer deposited on the carbon substrate.

2. The electrode according to claim 1, wherein the ultrafine carbon fibers have carbon nanotubes or carbon nanofibers grown on the surface thereof.

3. The electrode according to claim 1, wherein the average diameter of the ultrafine carbon fibers is in the range of 1 to 3,000 nm.

4. The electrode according to claim 1, the thickness of the carbon substrate is in the range of 1 to 30 μm.

5. The electrode according to claim 1, wherein the collector is composed of a metal selected from the group consisting of titanium, palladium, platinum, stainless steel, tantalum, and an alloy thereof.

6. The electrode according to claim 1, wherein the metal oxide thin layer is composed of a metal oxide selected from the group consisting of ruthenium oxide, manganese oxide, nickel oxide, vanadium oxide, cobalt oxide, tungsten oxide, iridium oxide, rubidium oxide, and a mixture thereof.

* * * * *